United States Patent Office 2,867,561
Patented Jan. 6, 1959

---

2,867,561

SULFURIZED TETRATHIOPHOSPHATES

Carleton B. Scott, Pomona, Calif., assignor, by mesne assignments, to Collier Carbon and Chemical Corporation, a corporation of California No Drawing. Application May 28, 1956
Serial No. 587,456

15 Claims. (Cl. 167—22)

This invention relates to certain sulfurized esters of tetrathiophosphoric acid and to compositions comprising the same. More particularly it concerns new and useful reaction products of dimethyl-tetrathiophosphate or trimethyl-tetrathiophosphate and elemental sulfur, and to fungicidal compositions comprising the same as the essential active ingredient.

In copending application Serial No. 532,803, filed September 6, 1955, trimethyl-tetrathiophosphate, $$(CH_3S)_3PS$$

herein referred to as "TMT," is shown to possess a high degree of fungicidal activity. The present invention is based on the discovery that TMT and its closely related homolog dimethyl-tetrathiophosphate acid $$(CH_3S)_2P(S)SH$$

herein referred to as "DMT," are capable of being reacted with elemental sulfur to form novel products which are at least equally toxic toward fungi. By reason of their containing a relatively high proportion of elemental sulfur, they are considerably less expensive per unit weight than their TMT and DMT precursors, and hence are capable of providing the same degree of fungistasis at a considerable reduction in cost. The novel sulfurized TMT and DMT products provided by the invention are also useful as extreme pressure additives in hydrocarbon lubricating oil compositions. These products are high-boiling viscous liquids of unknown molecular structure; accordingly, they are herein described and claimed as reaction products rather than as definite chemical compounds.

The reaction between TMT or DMT and elemental sulfur to form the novel products of the invention takes place readily upon heating a mixture of the two reactants under such condition of temperature, pressure and time that the sulfur becomes chemically bound to the thiophosphate and does not separate therefrom when the mixture is cooled to ambient temperatures or is diluted with a solvent such as acetone. If a mixture of free sulfur and TMT or DMT is gradually heated it will be observed that at a relatively low temperature, e. g., about 130° C., the sulfur dissolves and the mixture becomes a single liquid phase. If the heating is stopped at this point and the mixture is allowed to cool to ambient temperature, the free sulfur precipitates, thus indicating that mere physical solution rather than chemical reaction has occurred. On the other hand, if the heating is continued and the temperature is allowed to increase to about 150° C. and is held there for a suitable period of time the liquid will not deposit free sulfur upon subsequent cooling, thereby indicating that true chemical reaction has occurred. Accordingly, in preparing the present TMT-sulfur and DMT-sulfur reaction products it is necessary that the two reactants be heated at such temperature and for such period of time that there is formed a product from which free sulfur cannot be precipitated by cooling to ambient temperature or by diluting with a non-solvent for free sulfur. The operable temperature range varies somewhat with the amount of sulfur sought to be combined with the TMT or DMT, but is usually at least about 150° C. and is preferably not greater than about 200° C. The time required for completion of the reaction likewise depends upon the proportions in which the two reactants are employed as well as upon the reaction temperature. Ordinarily, however, such time is between about 1 and about 20 hours. Since the tetrathiophosphate reactants, particularly TMT, tend to decompose upon being heated at atmospheric pressure, the reaction should be effected in a closed vessel under a pressure of at least about 5 p. s. i. g. and preferably equal to the autogenic pressure developed at the particular reaction temperature employed. When DMT is employed as the tetrathiophosphate reactant, hydrogen sulfide is evolved from the reaction mixture and provision should be made for its removal; conveniently, this is accomplished by providing the vessel with a pressure relief valve set to open at the desired operating pressure. According to a preferred mode of operation, the reaction is carried out at a temperature between about 150° C. and about 200° C. for a period of time between about 1 and about 20 hours and under autogenic pressure.

The proportions in which sulfur combines with TMT or DMT to form the present products vary from about 1 to about 8 atoms of sulfur per mole of the tetrathiophosphate. Accordingly, in preparing such products, between about 1 and about 8 gram atoms of sulfur are provided per gram mole of the tetrathiophosphate. When the latter is TMT, such proportions are equivalent to between about 0.16 and about 1.3 parts by weight of sulfur per part of TMT; when the tetrathiophosphate is DMT, such proportions are equivalent to between about 0.17 and about 1.4 parts by weight of sulfur per part of DMT. The physical and biological properties of the products vary somewhat with the amount of sulfur contained therein, and insofar as fungicidal activity and ease of formulating into simple fungicidal compositions is concerned it is preferred to employ the products prepared by combining from about 1 to about 6 atoms of sulfur with 1 mole of TMT or DMT.

Procedurewise, the reaction is carried out simply by charging the desired amounts of the two reactants into a reaction vessel and heating the mixture under the conditions previously described. If desired, the reaction mixture may comprise an inert solvent or reaction medium, e. g., benzene, toluene, carbon tetrachloride, etc. which serves to promote intimate contact between the two reactants and to secure uniform heating of the same. Upon completion of the reaction such solvent can be readily removed by distillation or evaporation, or it may be allowed to remain therewith to serve as a dispersing aid in formulating fungicidal compositions. In some instances it may be found that by reason of employing too low a reaction temperature or too short a reaction time a small amount of unreacted sulfur precipitates when the reaction product is cooled to ambient temperature. Should this occur, the precipitated sulfur may readily be separated by simple filtration.

The following examples will illustrate the preparation of several of the present class of reaction products, but are not to be construed as limiting the invention.

*Example 1*

A mixture consisting of 76.5 parts by weight of trimethyl-tetrathiophosphate and 96 parts by weight of powdered sulfur was placed in a pressure vessel and heated at about 150° C. for 5 hours under autogenic pressure. The vessel and contents were cooled to room temperature, and the reaction product was stored overnight at about 0° C., whereby there was precipitated a small quantity of unreacted sulfur. The latter was filtered off to obtain the sulfurized TMT product as a viscous yellow liquid having the following analysis

|  | Product | TMT reactant |
|---|---|---|
| Carbon, percent | 9.2 | 17.6 |
| Hydrogen, percent | 2.4 | 4.5 |
| Phosphorus, percent | 7.4 | 15.2 |
| Sulfur, percent | 80.2 | 62.7 |

These analytical values correspond closely to the calculated values for $(CH_3)_3PS \cdot S_6$.

*Example 2*

A mixture consisting of 95 parts by weight of dimethyl-tetrathiophosphate, 96 parts by weight of powdered sulfur, and 195 parts by weight of benzene was placed in a pressure vessel and pressured up to 60 p. s. i. g. with nitrogen. The vessel and contents were heated at 120°–150° C. for 5 hours, during which time the pressure within the vessel reached a maximum of about 85 p. s. i. g. and gas was evolved from the reaction mixture and discharged through a pressure relief valve set to open at such pressure. The reaction product was cooled and a small amount of unreacted sulfur which was thereby precipitated was filtered off. After evaporation of the benzene the sulfurized DMT product was obtained as a viscous yellow liquid having the following analysis:

|  | Product | TMT reactant |
|---|---|---|
| Carbon, percent | 10.6 | 12.7 |
| Hydrogen, percent | 2.4 | 3.7 |
| Phosphorus, percent | 9.7 | 16.3 |
| Sulfur, percent | 76.9 | 67.4 |

Their values show that an average of 2.5 atoms of sulfur were combined with each molecule of DMT.

*Example 3*

A mixture of 102 grams of trimethyl-tetrathiophosphate and 16 grams of sulfur was heated at about 150° C. for five hours under autogenic pressure. The product so obtained was a dark yellow slightly viscous liquid from which no sulfur could be precipitated by cooling to —80° C. Its ultimate analysis corresponded very closely to that calculated for one molecule of TMT combined with one atom of sulfur.

The fungicidal compositions of the present invention are prepared by combining one or a mixture of the sulfurized tetrathiophosphate products prepared as described above with a liquid or solid inert carrier material in the conventional manner. Thus, one or a mixture of such products may be dispersed in water with the aid of a dispersing agent to form a concentrate composition which is subsequently diluted with water to form a spray suitable for application to living plants, lumber and other materials subject to fungus attack. Alternatively, the products may be admixed with an inert solid diluent such as starch, talc, diatomaceous earth, aluminum silicate, etc. to form dry compositions which can be employed directly as fungicidal dusts or can be dispersed in an aqueous or oleaginous medium and applied as a liquid spray. In general, any of the conventional techniques may be applied in employing the present class of fungicidal agents, and any of the various known wetting agents, spreaders, sticking agents, diluents, supplementary toxicants, etc., may be employed in combination with such products. The latter are substantially non-phytotoxic and may be applied to living plants in relatively concentrated form. However, as will be apparent from the test data presented below, the fungicides of the present class are highly effective in very small quantities and in the interests of economy they are usually applied at concentrations of the order of 50–2000 parts per million. Liquid concentrate compositions usually contain between about 1 and about 15 percent by weight of the active ingredient and sufficient of an emulsifying or dispersing agent to maintain the active ingredient uniformly dispersed in the liquid suspending medium. Solid concentrates usually contain between about 5 and about 50 percent by weight of the active ingredient and, optionally, small amounts of spreading agents and other conventional adjuvants.

The following examples will illustrate the formulation of a number of typical fungicidal compositions comprising members of the present class of sulfurized tetrathiophosphates as the primary toxic agent, but are not to be construed as limiting the invention. The abbreviation "TMT-$S_x$" and "DMT-$S_x$" are employed to designate the herein described sulfurized trimethyl-tetrathiophosphates and sulfurized dimethyl-tetrathiophosphates, respectively, with "x" representing the number of sulfur atoms which have been chemically combined with the tetrathiophosphate molecule.

*Example 4*

|  | Pounds |
|---|---|
| TMT-$S_6$ | 2.5 |
| Aluminum silicate | 50.0 |
| Powdered blood albumin | 0.3 |

*Example 5*

|  | Pounds |
|---|---|
| DMT-$S_1$ | 2.5 |
| Water | 50.0 |
| Powdered blood albumin | 0.3 |

The toxic agent and the blood albumin are added to the water, and the mixture is passed through a colloid mill or high speed blender to obtain a concentrate composition which can be diluted 1000:1 with water to obtain a fungicidal spray for application to living plants.

*Example 6*

|  | Pounds |
|---|---|
| TMT-$S_2$ | 15.0 |
| Benzene | 50.0 |
| Kerosene extract oil | 100.0 |
| Spray oil | 4000.0 |

This composition is suitable for impregnating lumber.

*Example 7*

|  | Pounds |
|---|---|
| TMT-$S_4$ | 1.3 |
| TMT-$S_5$ | 1.3 |
| Water | 50.0 |
| Commercial sticking agent | 0.5 |
| Commercial spreading agent | 0.5 |

The ingredients are mixed in a colloid mill and are thereafter diluted with 2000 gallons of water to obtain a spray composition containing about 100 parts per million of the active ingredient.

*Example 8*

|  | Pounds |
|---|---|
| DMT-$S_2$ | 5.0 |
| Diatomaceous earth | 10,000.0 |
| Commercial sticking agent | 10.0 |
| Benzene | 25.0 |

The active ingredient is dissolved in the benzene and the resulting solution is admixed with the remaining ingredients in a ball mill to obtain a fungicidal dusting composition.

In order to demonstrate the fungicidal activity of the present sulfurized tetrathiophosphates, the following test procedure is employed. The active ingredient is formulated into a wettable powder by grinding together and intimately admixing the following ingredients:

| | Pts. by wt. |
|---|---|
| Active ingredient | 10.0 |
| Attapulgus clay | 30.0 |
| "Neoterge" wetting agent | 0.12 |
| "Duponol ME" wetting agent | 0.05 |
| Lignin sulfate suspending agent | 0.12 |

A 10-gram sample of the wettable powder is added to sufficient distilled water to make 100 grams, and the mixture is homogenized for 3 minutes in a high speed blender. With the blender still operating, a 3-gram sample of the liquid is removed and is stirred into 75 grams of liquid potato dextrose agar at 45° C., and the agar is transferred to a Petri dish. The agar so prepared contains 1000 p. p. m. of the active ingredient in the wettable powder. If lower concentrations, e. g., 10 or 100 p. p. m. are to be tested, 1-gram portions of the concentrate composition in the blender are diluted with agar accordingly. The agar is allowed to cool to room temperature, whereupon it solidifies, and a ¼" disc of the test fungus inoculum is placed on the surface of the agar. The inoculated agar is incubated at room temperature for two days, after which the extent of fungus growth is measured and the percent inhibition of fungus growth is calculated from the formula:

$$100 - \frac{\text{growth on test sample}}{\text{growth on blank}} \times 100$$

The following tabulation presents the inhibition values obtained by subjecting a number of the sulfurized tetrathiophosphates of the present invention to the foregoing test procedure, employing a variety of test organisms.

ling these organisms; unsulfurized TMT, however, provided substantially no control.

Other modes of applying the principle of my invention may be employed instead of those explained, change being made as regards the methods or materials employed, provided the products stated by any of the following claims or the equivalent of such stated products be obtained.

I, therefore, particularly point out and distinctly claim as my invention.

1. As a new composition of matter, a sulfurized tetrathiophosphate product containing from 1 to about 8 atoms of chemically combined sulfur per molecule of tetrathiophosphate, said product being obtained by heating a mixture comprising elemental sulfur and a tetrathiophosphate selected from the class consisting of trimethyl-tetrathiophosphate and dimethyl-tetrathiophosphate in a ratio of between 1 and about 8 atomic weights of sulfur per molecular weight of said tetrathiophosphate at a reaction temperature between about 150° C. and about 200° C. for a period of time between about 1 and about 20 hours under a pressure between about 5 p. s. i. g. and the autogenic pressure of the reaction mixture at said reaction temperature, said conditions of time and temperature being sufficient to effect the formation of said sulfurized tetrathiophosphate product.

2. A product as defined by claim 1 wherein the said tetrathiophosphate reactant is trimethyl-tetrathiophosphate.

3. A product as defined by claim 1 wherein the said tetrathiophosphate reactant is dimethyl-tetrathiophosphate.

4. A sulfurized tetrathiophosphate product as defined by claim 1 and containing between 1 and about 6 atoms

| Product tested | | Percent inhibition | | | | | | | |
|---|---|---|---|---|---|---|---|---|---|
| Identity | Conc., p. p. m. | R. solani | S. rolfsii | P. cinnamomi | P. ultimum | S. sclerotiorum | S. fructicola | B. cinerea | A. solani | Average for all organisms |
| DMT | 100 | 62.5 | 86.7 | 100 | 50.0 | 81.0 | 94.6 | 93.7 | 34.5 | 75.4 |
| DMT | 1,000 | 100 | 100 | 100 | 100 | 100 | 100 | 100 | 100 | 100 |
| MDT-S$_{2+\frac{1}{2}}$ | 100 | 90.0 | 91.7 | 100 | 100 | 96.8 | 78.4 | 91.5 | 73.9 | 90.3 |
| DMT-S$_{2+\frac{1}{2}}$ | 1,000 | 100 | 100 | 100 | 100 | 100 | 100 | 100 | 100 | 100 |
| TMT | 100 | 100 | 100 | 100 | 100 | 100 | 100 | 100 | 100 | 100 |
| TMT | 1,000 | 100 | 100 | 100 | 100 | 100 | 100 | 100 | 100 | 100 |
| TMT-S$_1$ | 100 | 96.2 | 100 | 100 | 100 | 100 | 100 | 98.8 | 85.7 | 97.6 |
| TMT-S$_1$ | 1,000 | 100 | 100 | 100 | 100 | 100 | 100 | 100 | 100 | 100 |
| TMT-S$_2$ | 100 | 96.2 | 100 | 100 | 100 | 100 | 100 | 100 | 100 | 99.5 |
| TMT-S$_2$ | 1,000 | 100 | 100 | 100 | 100 | 100 | 100 | 100 | 100 | 100 |
| TMT-S$_3$ | 100 | 90.4 | 70.6 | 100 | 100 | 100 | 100 | 97.6 | 85.7 | 93.0 |
| TMT-S$_3$ | 1,000 | 100 | 100 | 100 | 100 | 100 | 100 | 100 | 100 | 100 |
| TMT-S$_4$ | 100 | 84.6 | 100 | 100 | 100 | 100 | 100 | 94.0 | 76.2 | 94.5 |
| TMT-S$_4$ | 1,000 | 100 | 100 | 100 | 100 | 100 | 100 | 100 | 100 | 100 |
| TMT-S$_5$ | 100 | 82.7 | 94.1 | 100 | 100 | 100 | 100 | 93.2 | 76.2 | 93.3 |
| TMT-S$_5$ | 1,000 | 100 | 100 | 100 | 100 | 100 | 100 | 100 | 100 | 100 |
| TMT-S$_6$ | 100 | 95.0 | 95.0 | 100 | 100 | 100 | 81.1 | 97.6 | 69.4 | 92.3 |
| TMT-S$_8$ | 1,000 | 100 | 100 | 100 | 100 | 100 | 100 | 100 | 100 | 100 |
| "Captan"[1] | 100 | | | | | | | | | 74.0 |
| Do | 1,000 | | | | | | | | | 90.0 |
| "Phygon"[1] | 100 | | | | | | | | | 59.0 |
| Do | 1,000 | | | | | | | | | 83.0 |

[1] Common commercial fungicide.

It will be noted from the above data that the present sulfurized products surpass two of the widely employed commercial fungicides, and are substantially as effective as the unsulfurized materials from which they are prepared. On a cost basis, the sulfurized products represent a considerable advantage over the unsulfurized materials.

In addition to their fungicidal activity, the present products, particularly sulfurized DMT, are effective as bactericides. Using standard testing procedure, the sulfurized DMT product prepared in Example 2 was found to be highly effective against *Erwinia carotovora, Pseudomonas syringae, Agrobacterium tumefaciens,* and *Xanthomomas juglandis*. The sulfurized TMT product prepared in Example 1 was likewise highly effective in controlof chemically combined sulfur per molecule of said tetrathiophosphate.

5. A product as defined in claim 4 wherein the said tetrathiophosphate reactant is trimethyl-tetrathiophosphate.

6. A product as defined by claim 4 wherein the said tetrathiophosphate reactant is dimethyl-tetrathiophosphate.

7. A fungicidal composition comprising the sulfurized tetrathiophosphate product defined by claim 1 as the essential active ingredient, and an inert fungicidal carrier material therefor.

8. A fungicidal composition as defined by claim 7 wherein the said carrier material comprises water and contains sufficient of a dispersing agent to maintain said active ingredient uniformly dispersed in said water.

9. A fungicidal composition as defined by claim 7 wherein the said carrier material comprises an inert particulate solid.

10. A fungicidal composition comprising the sulfurized tetrathiophosphate product defined by claim 4 as the essential active ingredient, and an inert fungicidal carrier material therefor.

11. A fungicidal composition comprising the sulfurized tetrathiophosphate product defined by claim 5 as the essential active ingredient, and an inert fungicidal carrier material therefor.

12. A fungicidal composition comprising the sulfurized tetrathiophosphate product defined by claim 6 as the essential active ingredient and an inert fungicidal carrier material therefor.

13. The method for controlling the growth of fungi which comprises bringing into contact with said fungi a fungicidal amount of the sulfurized tetrathiophosphate product defined by claim 1.

14. The method for controlling the growth of fungi which comprises bringing into contact with said fungi a fungicidal amount of the sulfurized tetrathiophosphate product defined by claim 4.

15. The method for controlling the growth of fungi which comprises bringing into contact with said fungi a fungicidal amount of the composition defined by claim 10.

No references cited.

UNITED STATES PATENT OFFICE
CERTIFICATE OF CORRECTION

January 6, 1959

Patent No. 2,867,561

Carleton B. Scott

It is hereby certified that error appears in the printed specification of the above numbered patent requiring correction and that the said Letters Patent should read as corrected below.

Column 1, line 29, strike out the word "acid"; column 3, line 34, second table, heading to the third column, for "TMT" read -- DMT --; columns 5 and 6, in the table, under the heading, "Identity", third item thereof, for "MDT-$S_{2+\frac{1}{2}}$" read -- DMT-$S_{2-\frac{1}{2}}$ --; same column, fourth item thereof, for "DMT-$S_{2+\frac{1}{2}}$" read -- DMT-$S_{2-\frac{1}{2}}$ --.

Signed and sealed this 5th day of May 1959.

(SEAL)
Attest:

KARL H. AXLINE
Attesting Officer

ROBERT C. WATSON
Commissioner of Patents